Figure 1:
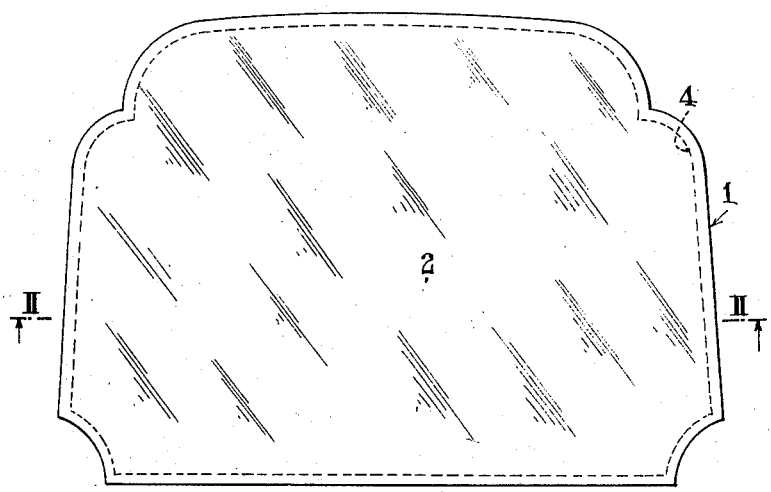

July 9, 1963 E. HENRY-BIABAUD 3,096,601
MOUNTING PROCESS FOR A LINING PANEL, IN PARTICULAR FOR VEHICLES
Filed Sept. 8, 1961 2 Sheets-Sheet 1

July 9, 1963  E. HENRY-BIABAUD  3,096,601
MOUNTING PROCESS FOR A LINING PANEL, IN PARTICULAR FOR VEHICLES
Filed Sept. 8, 1961  2 Sheets-Sheet 2 ns, these clips 6 are preferably designed to be mounted on said surface 5 along the length of this openwork; for this purpose they are S-shaped, the lower loop firmly gripping the sheet metal of the vehicle door, along the length of the openwork 7, while the upper loop 9 maintains an elastic grip on the panel edge 1.

3,096,601
MOUNTING PROCESS FOR A LINING PANEL, IN PARTICULAR FOR VEHICLES

Edmond Henry-Biabaud, Paris, France, assignor to Societe Anonyme Andre Citroen, Paris, France
Filed Sept. 8, 1961, Ser. No. 136,857
1 Claim. (Cl. 45—138)

Extensively used in the furniture industry, for example in covering the ends of sofas, as well as in the automobile industry for lining the interior of vehicle doors, there is a constant need for panels covered with a decorative lining.

These covered panels are made up of a sheet framework, usually of thin plywood, cut-out to the proper dimensions, over which is stretches a sheet of decorative plastic material, cut-out to the same contour, with or without interposition of a padding material.

These panels are mounted on the component to be dressed by gluing, clipping or nailing.

Such mounting processes, often lacking in esthetic value, require long and qualified labor, thus raising considerably the cost price of the component to be dressed.

To counteract these disadvantages, the present invention has for its object a process for mounting a covered panel on the surface of the component to be dressed, characterized in that said panel is inserted into a rim of appropriate shape, set beforehand in said surface.

Figure 2:
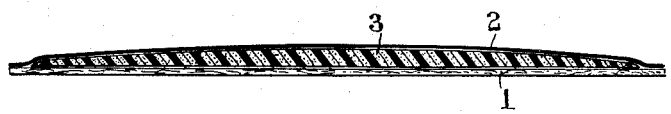
Figure 3:
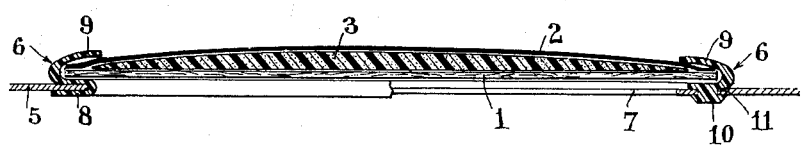
Figure 4:
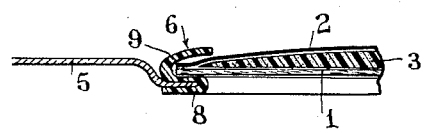
Figure 5:
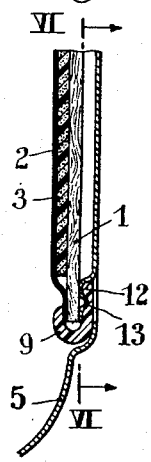
Figure 6:
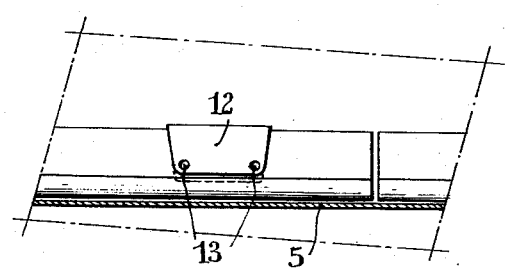

A more detailed description will now be given, by way of example only and by no means in alimiting sense, of several preferred forms of embodiment of the mounting process for such a covered panel on the surface to be dressed, which process constitutes the object of the present invention, with reference to the accompanying drawing, wherein:

FIGURE 1 is a plan view of said covered panel.
FIGURE 2 is a section view along II—II of FIG. 1.
FIGURE 3 is a view similar to FIG. 3 but after mounting of the panel on the surface to be lined.
FIGURES 4 and 5 are two modified forms of embodiment of the mounting device.
FIGURE 6 is a section view along line VI—VI of FIG. 5.

The panel described is designed to line the interior of an automobile door and, generally speaking, any surface capable of using sheet cut-outs as a fastening point.

Upon a sheet of plywood 1, suitably cut out to match the contour of the interior of the automobile door, is placed a decorative sheet 2 of vinylite resin, after interposition of a padding 3 of cellular material, for example.

The sheet 2, as well as the padding 3, is cut out to the same shape as the frame sheet 1, then joined to this sheet in the usual way at points along the periphery.

To mount the panel thus prepared against the interior surface 5 of the automobile door, clips 6 are used which are capable of being maintained firmly in contact with said surface 5 and of receiving the edges of said panel.

If the interior surface 5 of the door includes an openwork 7 designed for example to provide access to the window-opening mechanism, or to the door-locking mech- When said interior surface 5 has no openwork, use is made of clips which can be fastened to this surface; for this purpose, the lower part of the clips carries a stud 10 which fits into holes 11 judiciously spaced along the surface. The upper part of these clips is bent into a loop designed to receive the panel.

In order to avoid excessive and unattractive thickness due to the superposition of the panel 1 on the door surface 5, the edges of the latter can be folded towards the inside an amount corresponding to the thickness of the panel.

These clips are preferably made of a material sufficiently flexible to allow for elastic attachment on or in the door surface and for insertion of the panel, and must also have sufficient holding force to maintain the lining in place regardless of the shocks and vibrations inherent to the conditions of use.

The rim can be of single curve section, therefore of more simple construction, if clamps can be cut out of or fastened to the support sheet; such clamps 12 are shown in FIG. 5 and are bent into the interior of the rim, as seen on the corresponding sectional view. Protrusions such as those at 13 can be provided for additional holding security under the clamps 12.

Such a mounting process for covered panels permits the achieving of a neat finish, giving the dressed component a particularly flattering appearance, and is advantageously adapted to a shaping of the surface in view of embellishing or emphasizing its contours, with possibility of levelling (FIG. 4).

Of course, it is to be understood that many modifications may be brought to the forms of embodiment described hereinabove with reference to the accompanying drawing, without thereby departing from the scope of the present invention.

What I claim is:

A device cooperative with the inner wall of a vehicle for securing an upholstery panel against said inner wall of the vehicle, said inner wall having struck-out fixation lugs, said lugs being bent inwardly, said device consisting of a section of flexible resilient material of channel cross-section adapted to fit resiliently over the panel edge and formed with an extension fitting between said wall and said lugs formed in said wall.

References Cited in the file of this patent

UNITED STATES PATENTS

| | | |
|---|---|---|
| 1,960,949 | Miller et al. | May 29, 1934 |
| 2,308,134 | Westrope | Jan. 12, 1943 |
| 2,334,881 | Mayes | Nov. 23, 1943 |
| 2,337,239 | Hall | Dec. 21, 1943 |
| 2,454,066 | Johnson | Nov. 16, 1948 |